Figure 1:
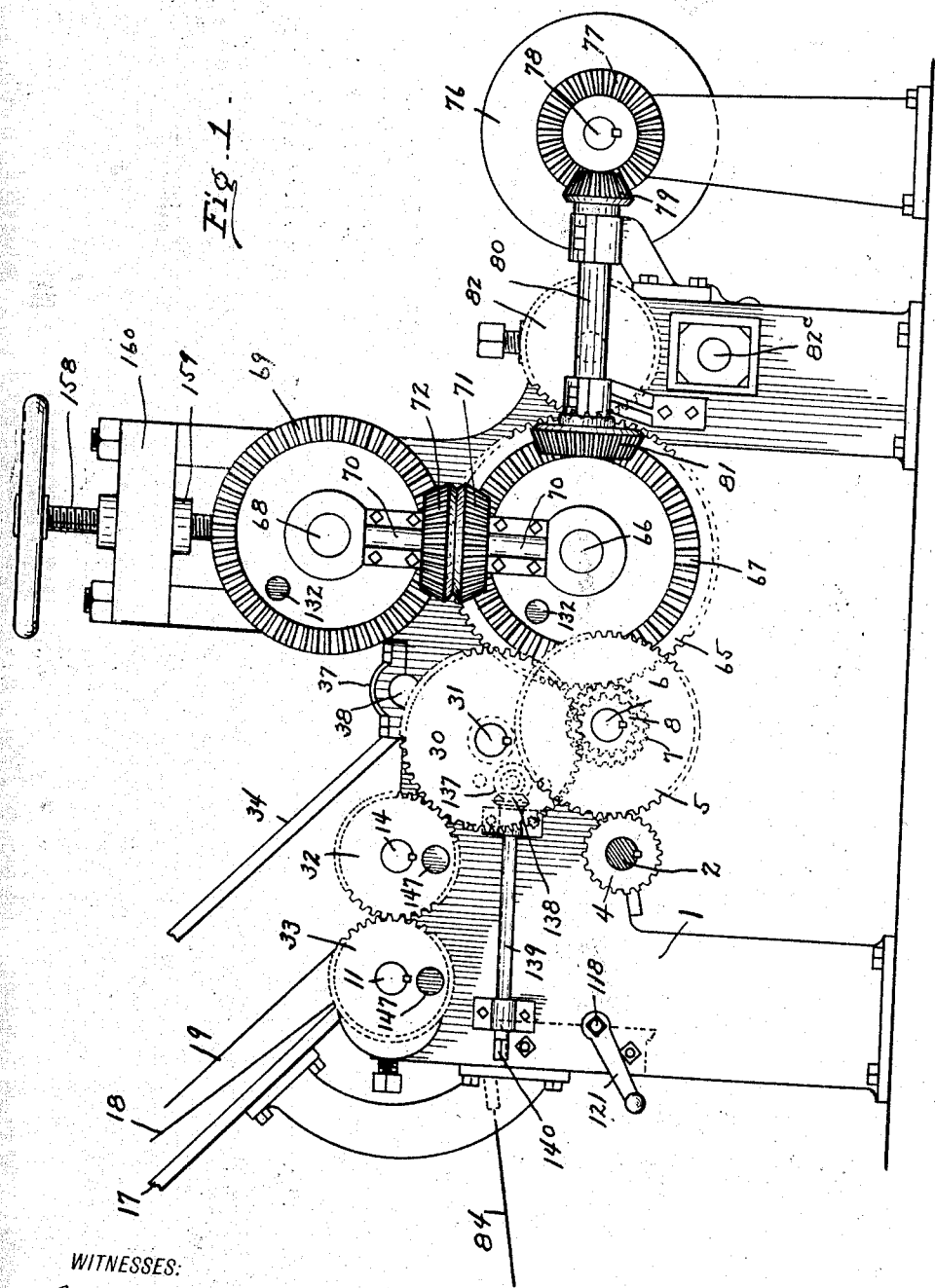

C. E. SAFFORD.
MACHINE FOR MAKING WIRE FABRIC OR FENCING.
APPLICATION FILED OCT. 23, 1911.

1,177,815.

Patented Apr. 4, 1916.
13 SHEETS—SHEET 1.

WITNESSES:

INVENTOR
C. E. Safford
BY
E. S. Wheeler
ATTORNEY

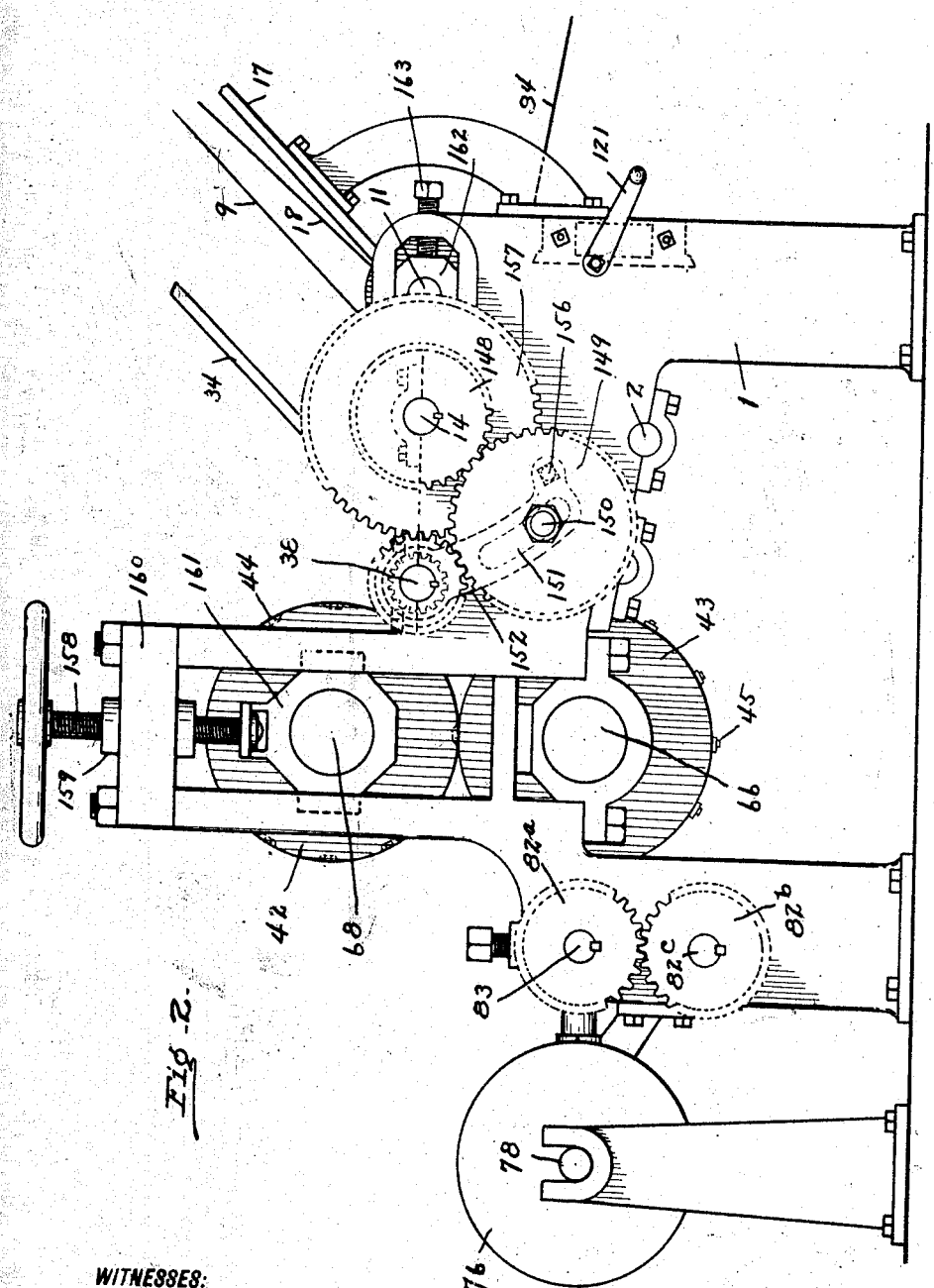

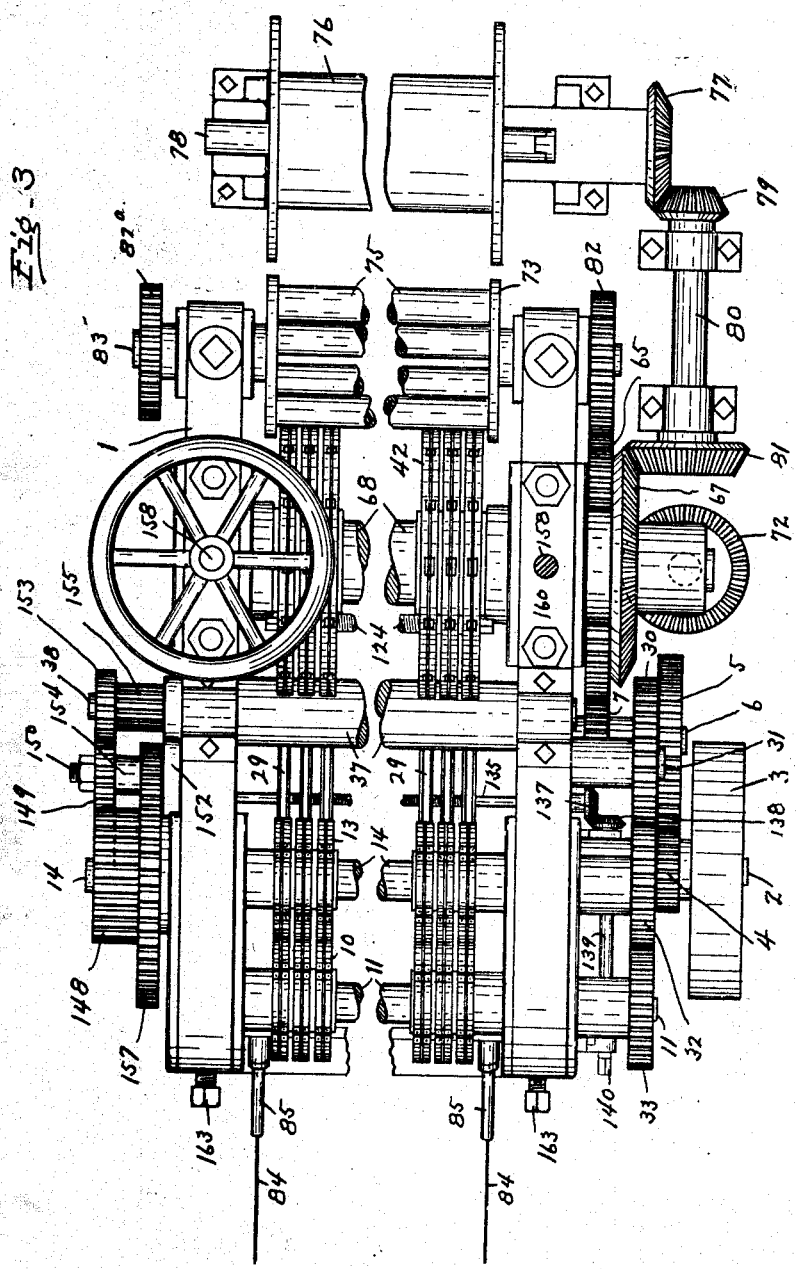

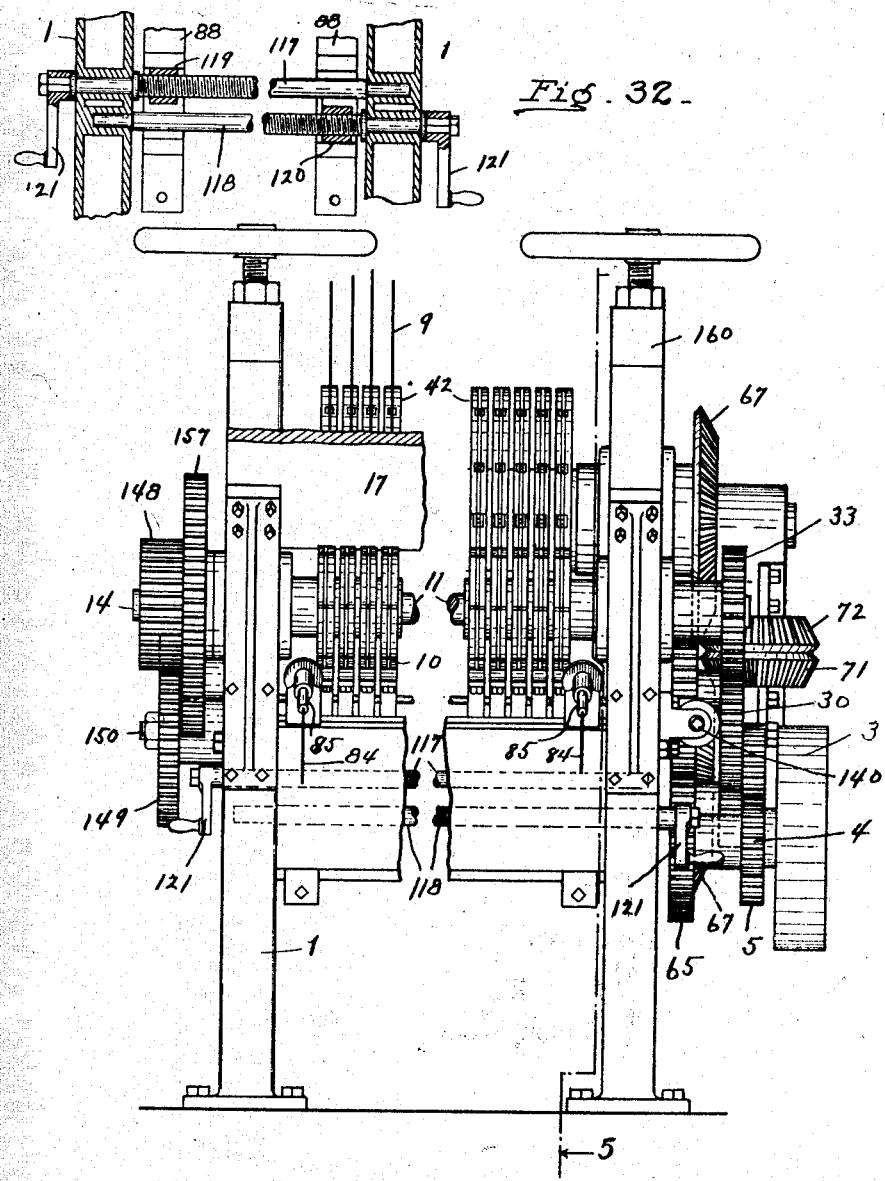

C. E. SAFFORD.
MACHINE FOR MAKING WIRE FABRIC OR FENCING.
APPLICATION FILED OCT. 23, 1911.
1,177,815.
Patented Apr. 4, 1916.
13 SHEETS—SHEET 5.
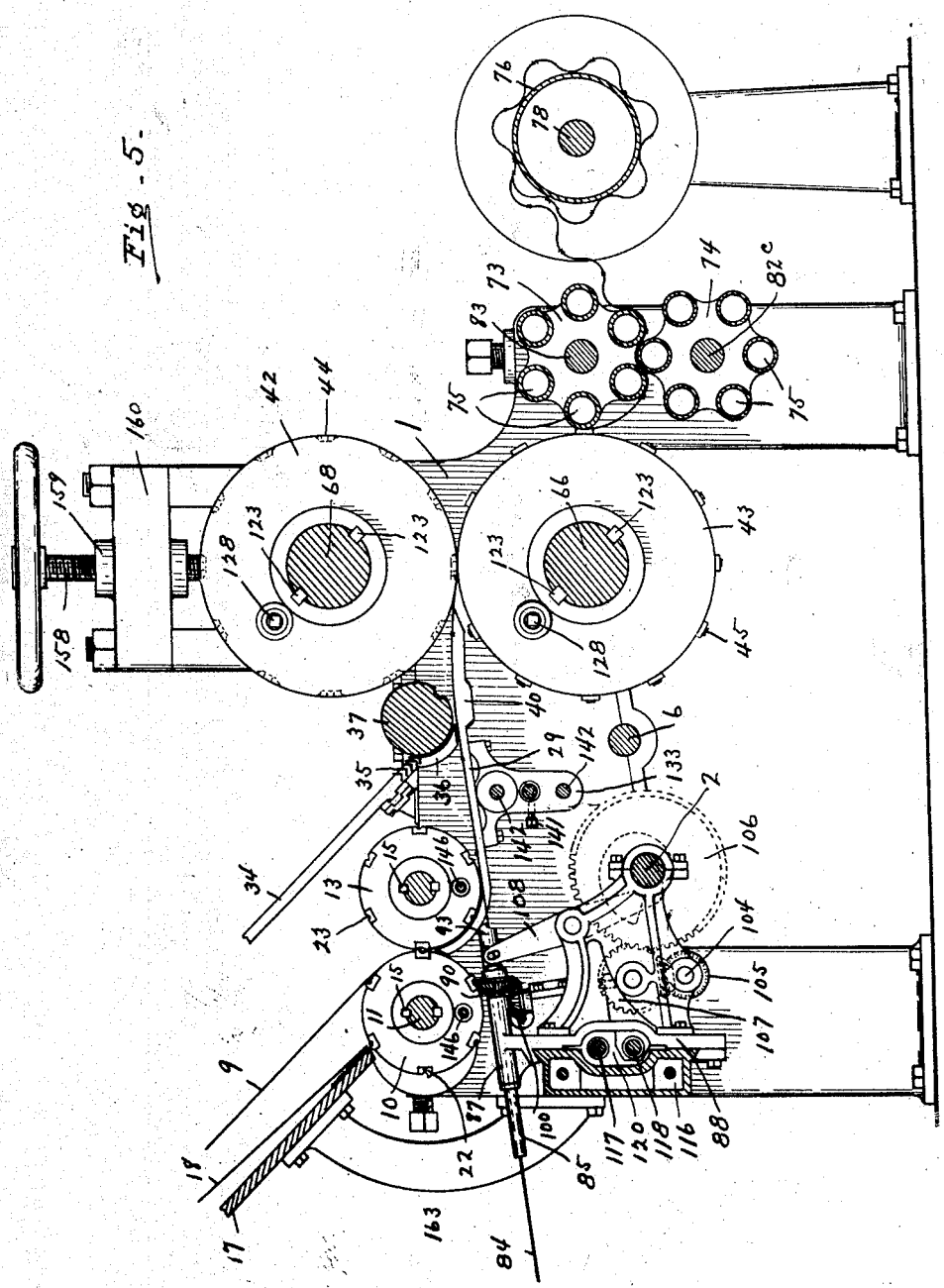
WITNESSES;
INVENTOR
C. E. Safford
BY
E. S. Wheeler
ATTORNEY

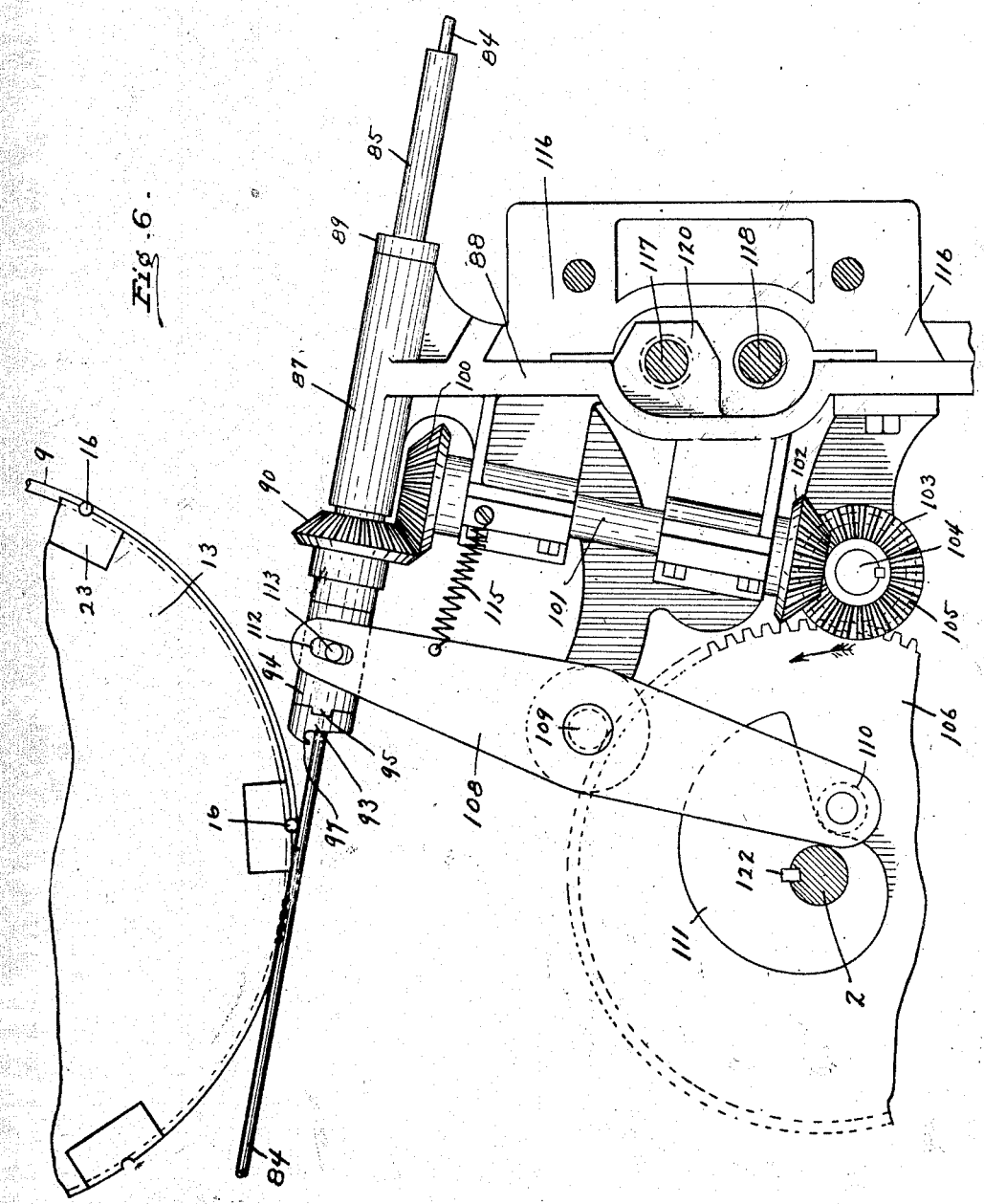

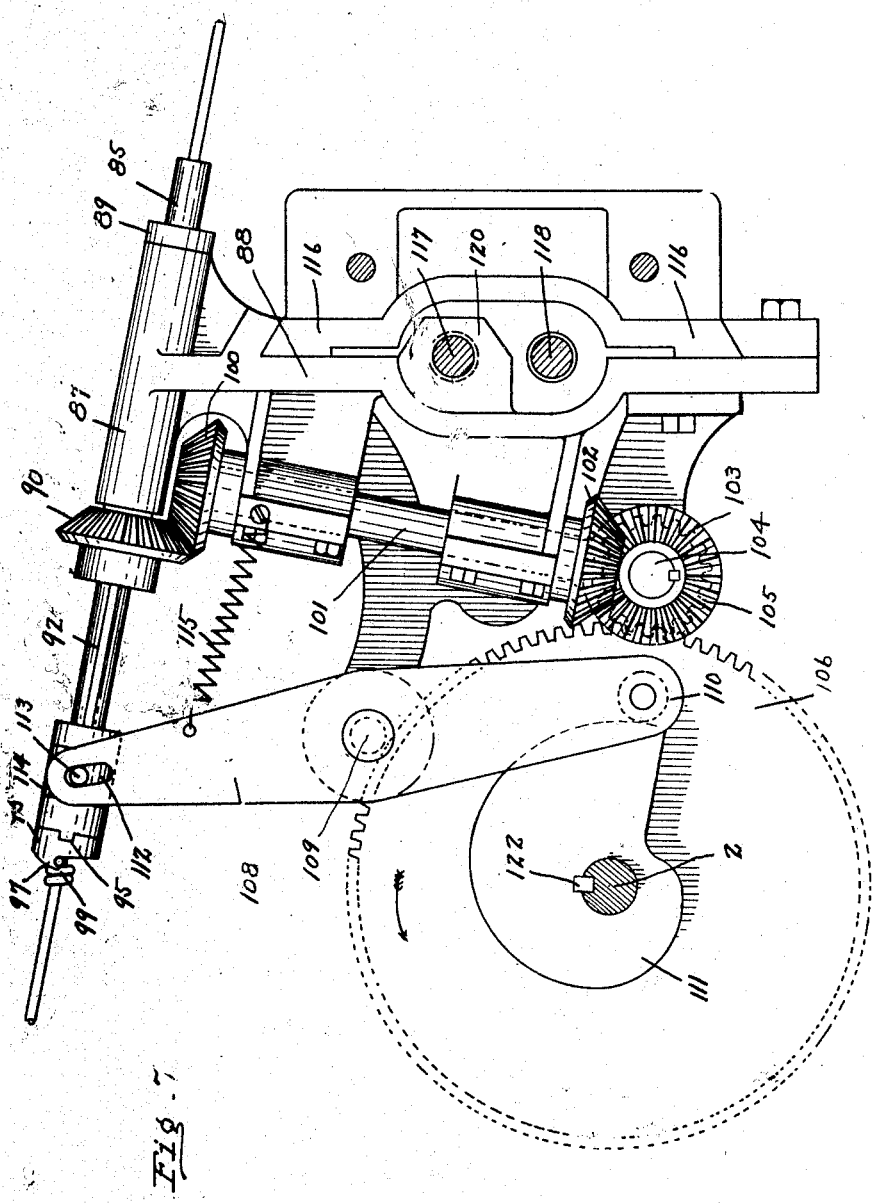

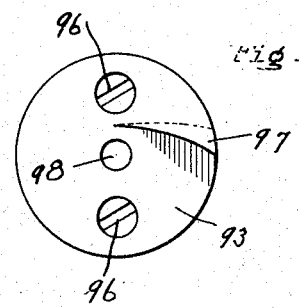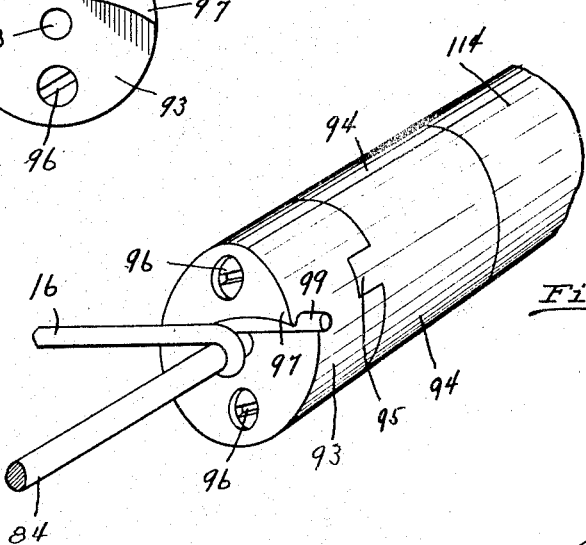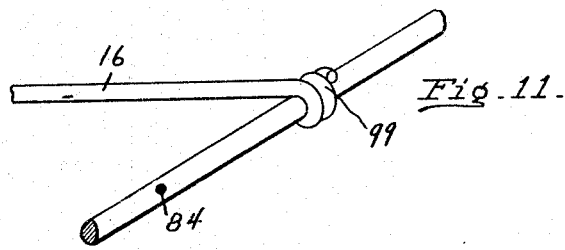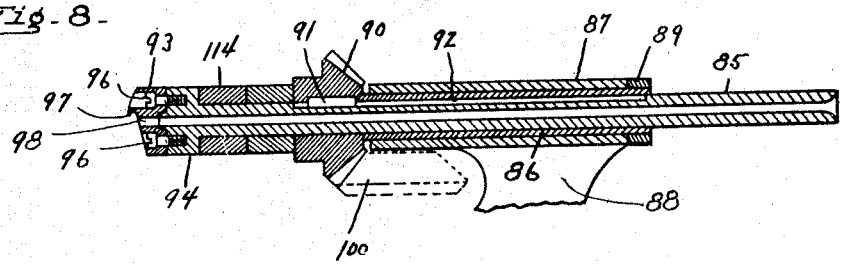

C. E. SAFFORD.
MACHINE FOR MAKING WIRE FABRIC OR FENCING.
APPLICATION FILED OCT. 23, 1911.
1,177,815.
Patented Apr. 4, 1916.
13 SHEETS—SHEET 9.
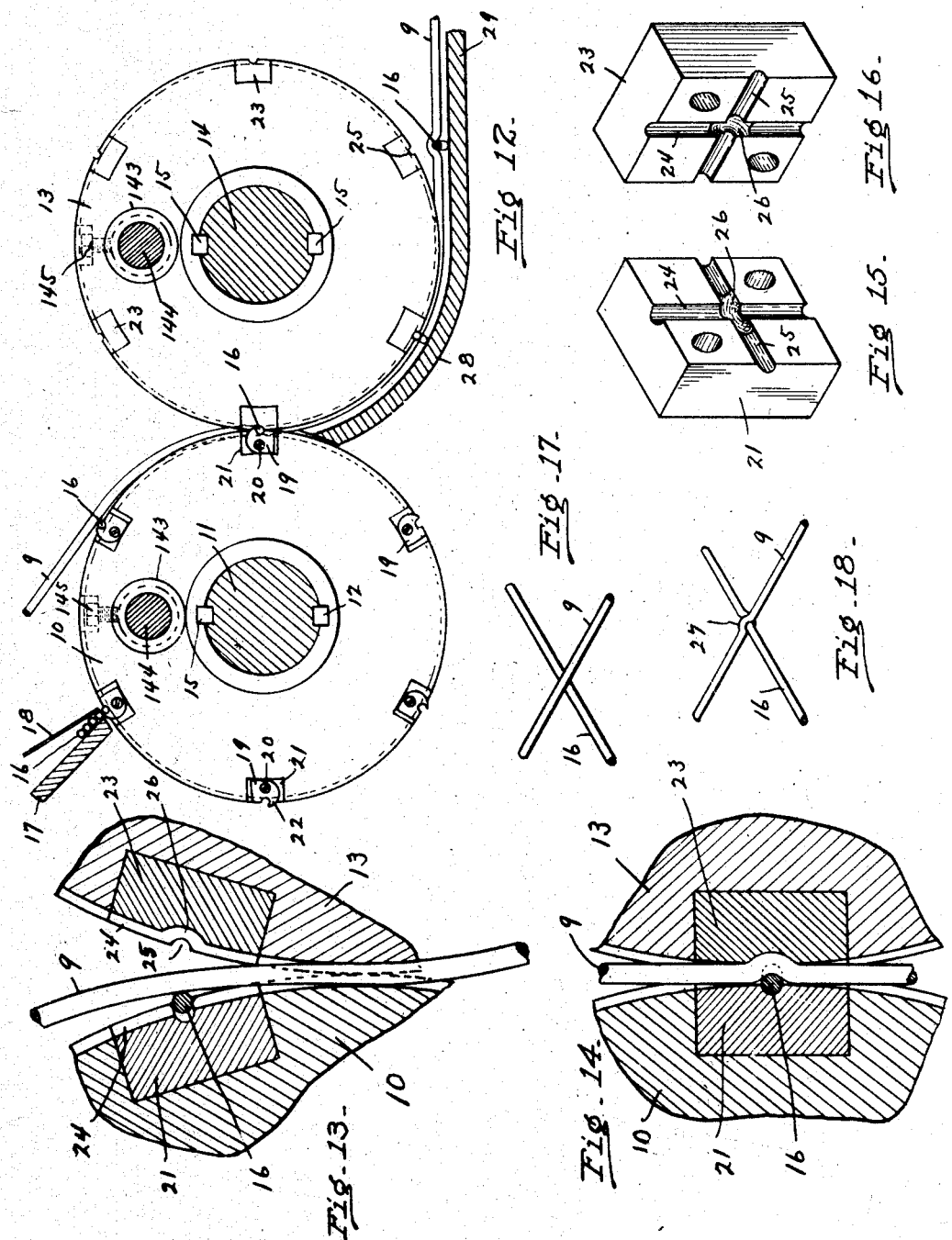

C. E. SAFFORD.
MACHINE FOR MAKING WIRE FABRIC OR FENCING.
APPLICATION FILED OCT. 23, 1911.
1,177,815.
Patented Apr. 4, 1916.
13 SHEETS—SHEET 10.
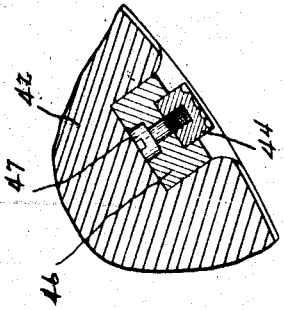
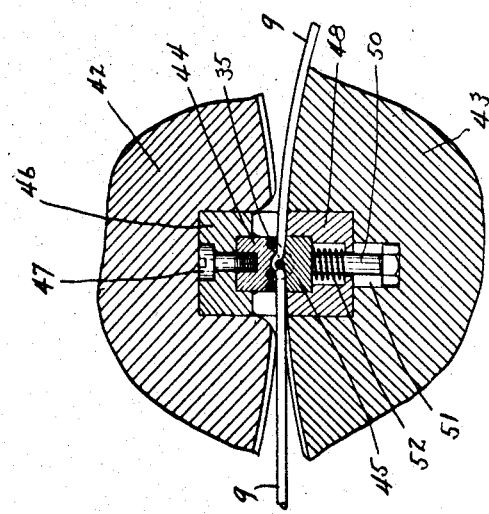
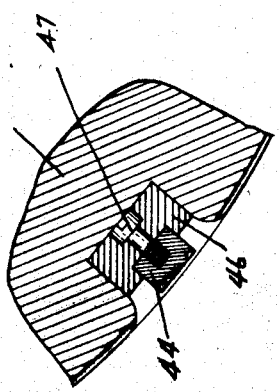
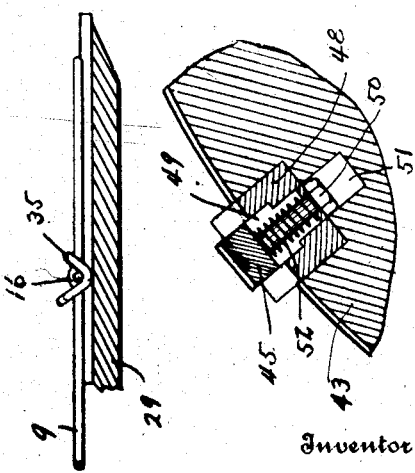

C. E. SAFFORD.
MACHINE FOR MAKING WIRE FABRIC OR FENCING.
APPLICATION FILED OCT. 23, 1911.
1,177,815.  Patented Apr. 4, 1916.
13 SHEETS—SHEET 11.
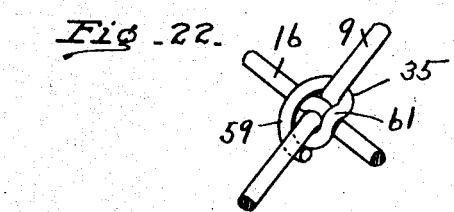
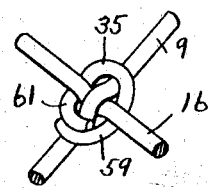
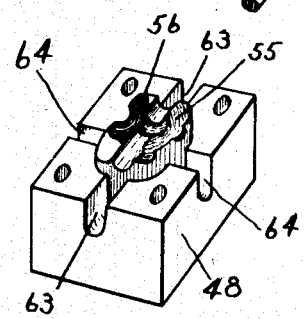
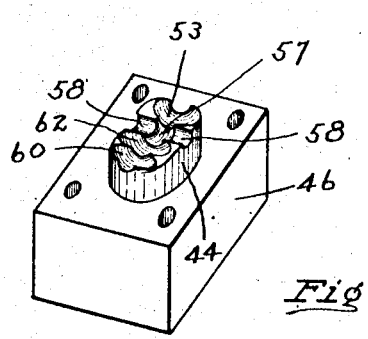
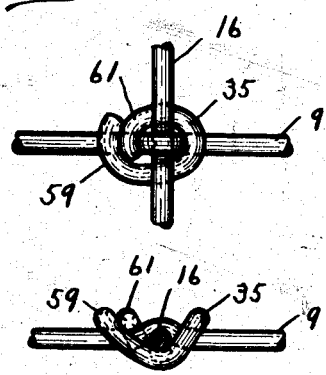
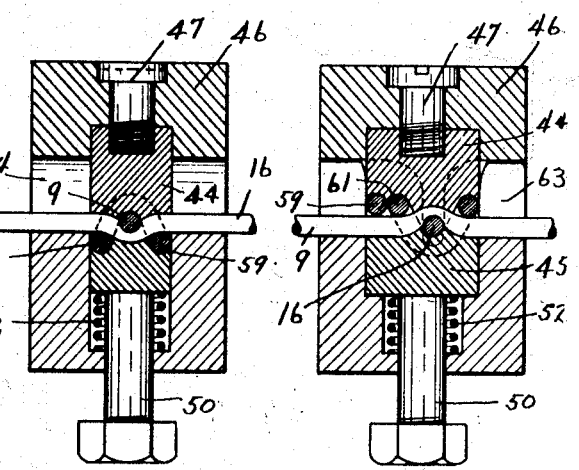
Witnesses
J. H. Perrault
M. E. Brocamble
Inventor
C. E. Safford
By E. S. Wheeler
Attorney C. E. SAFFORD.
MACHINE FOR MAKING WIRE FABRIC OR FENCING.
APPLICATION FILED OCT. 23, 1911.

1,177,815.

Patented Apr. 4, 1916.
13 SHEETS—SHEET 12.

Witnesses

Inventor
C. E. Safford
By E. S. Wheeler
Attorney

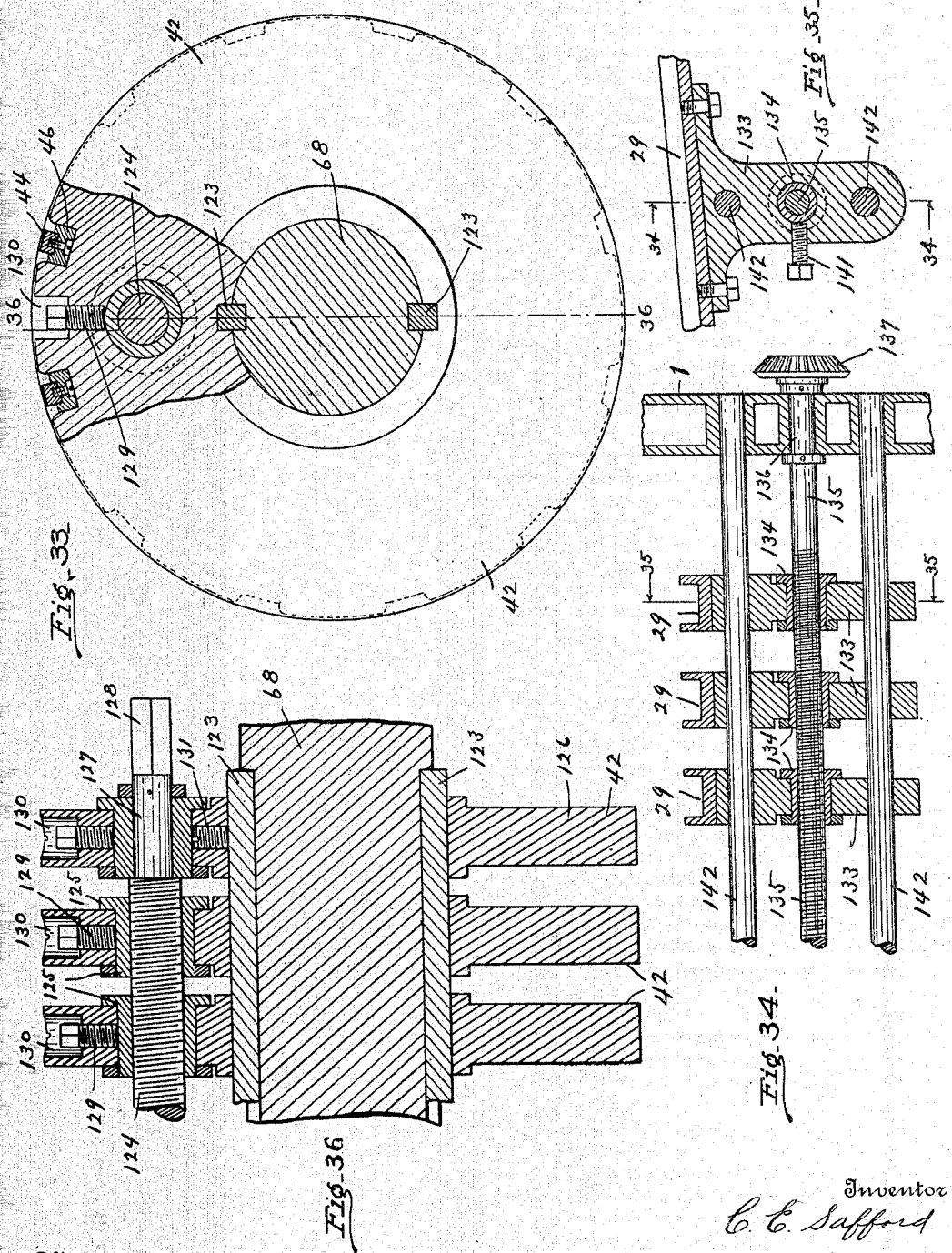

UNITED STATES PATENT OFFICE.

CLARENCE E. SAFFORD, OF DETROIT, MICHIGAN.

MACHINE FOR MAKING WIRE FABRIC OR FENCING.

1,177,815.  Specification of Letters Patent.  Patented Apr. 4, 1916.

Application filed October 23, 1911. Serial No. 656,099.

*To all whom it may concern:*

Be it known that I, CLARENCE E. SAFFORD, a citizen of the United States, residing at Detroit, in the county of Wayne, State of Michigan, have invented certain new and useful Improvements in Machines for Making Wire Fabric or Fencing; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in machines for making wire fabric or fencing, and relates to that class of machines through the medium of which transverse or stay wires are attached to the longitudinal or strand wires by means of ties in the form of staples which are caused to embrace said strands at their points of crossing in a manner to firmly tie them together.

The invention consists in the construction and operation of parts all as hereinafter more fully set forth and pointed out particularly in the claims.

The object of the invention is to provide simple and efficient means whereby the stay wires may be placed transversely of the strand wires, the tying staples fed to the intersections of said wires, and said staples formed about said intersecting wires in a manner to firmly tie them together, the arrangement being such as to perform said operations during the continuous passage of the wires through the machine.

The invention further contemplates the employment of rotatable twisters by means of which the ends of the stay wires may be wrapped around the selvage wires of the fencing or fabric.

The invention further contemplates means for adjusting said twisters laterally of the machine in order to provide for the making of fencing of various widths.

The invention further contemplates the construction and coöperation of the various instrumentalities through the medium of which the several steps of manufacturing the fabric are performed and the function of the machine is carried out.

The above object is attained by the mechanism illustrated in the accompanying drawings, in which:—

Figure 30:
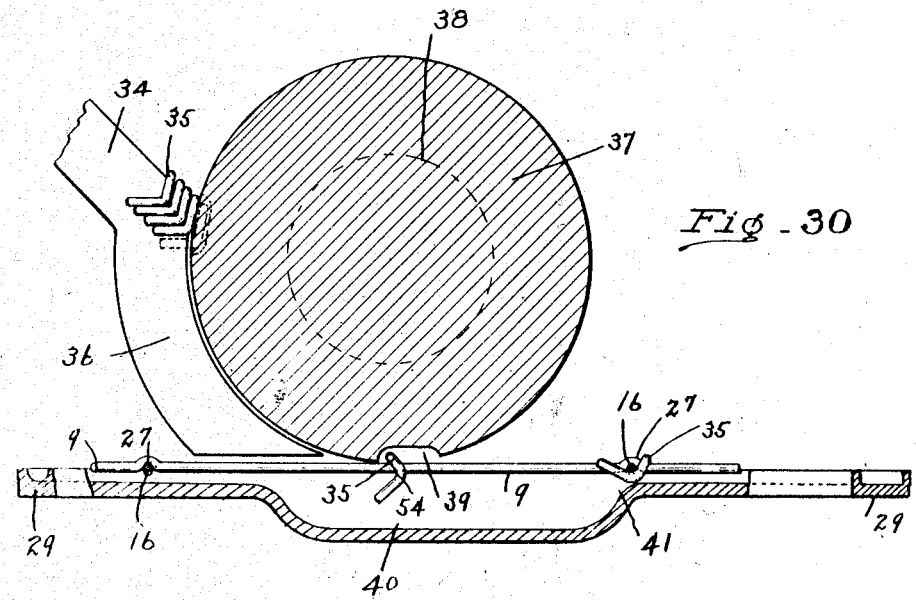
Figure 31:
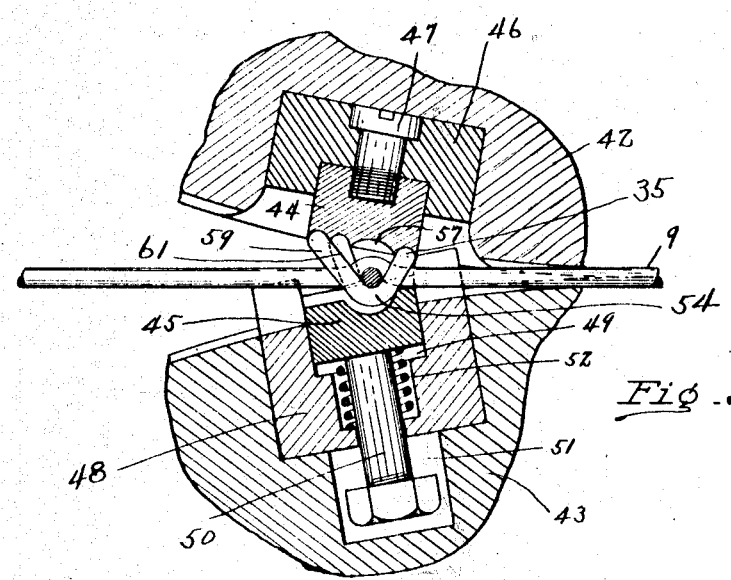

Figure 1 is a side elevation of a machine embodying my invention, the main drive shaft only appearing in section and the driving pulley thereon being omitted from said figure. Fig. 2 is an elevation of the machine showing the side thereof opposite to that shown in Fig. 1. Fig. 3 is a top plan of the machine, parts being broken away. Fig. 4 is a front end elevation, parts being broken away. Fig. 5 is a longitudinal section as on line 5—5 of Fig. 4. Fig. 6 is an enlarged fragmentary view showing one set of the operative parts employed to effect a twisting of the terminals of the stay wires around the selvage wires of the fabric. Fig. 7 is a similar view showing the position of parts at the completion of the operation of twisting. Fig. 8 is a longitudinal section through the hollow rotary spindle carrying the twister head. Fig. 9 is a fragmentary view in perspective of the end of said spindle and the twister head mounted thereon. Fig. 10 is an end elevation of said head. Fig. 11 is a fragmentary view in perspective, showing the end of a stay wire wrapped around one of the selvage wires of the fabric and illustrating the result of the operation of one of the twisting devices. Fig. 12 is a fragmentary view partly in section illustrating the manner of feeding the stay wires across the strand wires and of crimping said wires together at their points of crossing. Fig. 13 is an enlarged fragmentary view in section showing a set of the coöperative dies in opposite faces of the crimping disks which effect the crimping of the crossed strands together, illustrating the position of the parts just prior to the operation of crimping. Fig. 14 is a similar view showing the position of parts at the completion of the crimping operation. Figs. 15 and 16 are perspective views of the working faces of the crimping dies. Fig. 17 is a perspective view of the crossed strands before being crimped together. Fig. 18 is a similar view after said strands have been crimped. Fig. 19 is a fragmentary view in section illustrating the relative position of parts prior to the closing of the tying dies upon the crossed strands and tying staple associated with said strands at the juncture thereof, said dies being mounted in the periphery of opposed coöperating disks. Fig. 20 is a similar view showing the dies closed upon the staple between whose working faces it is fashioned into a tie which embraces the crossed strands of the fabric. Fig. 21 is a similar view showing the dies separated by the rotation of said disks and the completed tie lying in the female die of the lower disk, and the longitudinal strand of the fabric lying in a channel in the face of said disk. Fig. 22 is a perspective view of the under face of the completed tie uniting the crossed strands of the fabric. Fig. 23 is a similar view of the upper face of said tie. Figs. 24 and 25 are perspective views of the working faces of the tying dies. Fig. 26 is an enlarged transverse section through the tying dies closed in the operation of forming the tie to join the crossed strands of the fabric, said section being parallel with the axis of the strand wire. Fig. 27 is a similar view at right angles to Fig. 26, or parallel with the axis of the stay wire. Fig. 28 is a plan view of the completed tie. Fig. 29 is an elevation of the tie shown in Fig. 28. Fig. 30 is a fragmentary view in section illustrating the operation of the rotatable cylinder which feeds the tying staples to the strand wires, and showing the manner of disposing said staples at each intersection of the strand and stay wires and of guiding them in proper relative position to the tying dies. Fig. 31 is an enlarged sectional view through a portion of the periphery of each of the tying disks and of a set of the tying dies therein, illustrating the initial position of the dies and of the staple therebetween in the operation of forming the legs of the staple across the strand wires in the operation of tying the crossed wires together. Fig. 32 is a fragmentary view in section illustrating the manner of shifting the brackets carrying the twisters which attach the ends of the stay wires to the selvage wires for the purpose of adjusting the machine to enable the manufacture of fencing of various widths. Fig. 33 is a view partly in section through the shaft of one of the tying disks and through a portion of said disk, illustrating the arrangement employed for shifting the tying disks upon their shafts and for locking them in place after adjustment. Fig. 34 is a fragmentary view in section through the mechanism employed for adjusting the tracks upon which the crossed strands of the fabric and the embracing staples are carried from the crimping disks to the tying disks, as though taken on line 34—34 of Fig. 35. Fig. 35 is a transverse section through one of said tracks and adjusting mechanism, as on line 35—35 of Fig. 34. Fig. 36 is an enlarged sectional view through a plurality of the tying disks longitudinally of the shaft on which they are mounted, as though taken on line 36—36 of Fig. 33.

Referring to the characters of reference, 1 designates the frame of the machine which may be of any suitable construction, in which is journaled the main shaft 2 carrying a driving pulley 3. On the main shaft 2 is a pinion 4 which meshes with a gear 5 on a transverse shaft 6 suitably supported in the frame. Besides the gear 5 said shaft also carries a gear 7 and a pinion 8 which are adapted as hereinafter explained to transmit movement to the various operative parts of the machine.

The longitudinal or strand wires 9, excepting the selvage wires, are fed into the machine over a series of grooved disks 10 which are disposed in parallelism upon a transverse shaft 11 such distance apart as will afford the desired spacing between the strand or longitudinal wires of the fencing, there being one of said disks 10 for each of said strand wires, and said disks being keyed to the shaft 11 by means of the keys 12, as shown in Fig. 12, in a manner to enable them to be adjusted longitudinally thereof to vary the spacing between the strand wires as may be desired. Coöperating with the disks 10 and running in peripheral contact therewith are the disks 13. The disks 13 are secured to the parallel shaft 14 by means of keys 15 in the same manner and for the same purpose that the disks 10 are secured to the shaft 11. The disks 13 are also channeled and are so disposed as to coöperate in pairs with the disks 10, the arrangement being such that each pair of said disks receives one of the strand wires between their peripheries which pass around the lower arc of the disks 10 in their travel through the machine as the disks 10 and 13 are revolved in unison in opposite directions.

The transverse or stay wires 16 are fed to the machine upon an inclined table 17 beneath a guide 18, which directs then into position transversely of the disks 10 adjacent the peripheries thereof. To provide for picking the stay wires successively from the inclined table 17 and to space them the proper distance apart as they are carried into the machine the disks 10 are provided at their peripheries with a plurality of spaced plates 19 secured by the screws 20 to the die blocks 21 set in the peripheries of said disks, said plates each having a curved finger or hook 22 which extends beyond the periphery of the disk and is adapted to engage the lowermost stay wire on the table 17 and carry said stay wire forward as the disk 10 revolves so as to present it under the strand wires which feed onto the disks 10 after the picking of the stay wires from the table 17 by the fingers of the plates 19, the intervals between the operations of picking the successive transverse wires from the table determining the spacing of the stay wires in the fabric.

To assist in maintaining the crossed strands of the fabric in proper relative position at the junctures thereof said strands are crimped together at their points of crossing. This crimping of the crossed strands is accomplished by means of coöperating dies 21 and 23 which are set in the peripheries of the disks 10 and 13 respectively, and which are provided in their faces with channels 24 and 25 crossing at right angles, there being at the juncture of said channels a deeper depression 26, as clearly shown in Figs. 15 and 16. The arrangement of parts is such that when the stay wires are picked from the table 17 they will lie in the transverse channels 25 of the die blocks 21 while the strand wires will lie in the channels 24 of the die blocks 21 across the stay wires. This position is maintained until the disks 10 and 13 roll together in peripheral contact at which time the die blocks 23 in the disks 13 will coöperate with the die blocks 21 in the disks 10 and will receive the crossed strands in the channels in the face thereof which will be brought into registering relation with the corresponding channels in the die 21. The pressure exerted upon the crossed strands as the dies come together with said strands between their working faces will cause said strands to become crimped onto each other, portions of each transverse strand being crowded into the depression 26 of the dies 21, and portions of each longitudinal strand being crowded into the depressions 26 of the dies 23, effecting the crimping of the strands together as shown at 27 in Fig. 18, the uncrimped position of said crossed strands being illustrated in Fig. 17. After the operation of crimping the crossed strands together between the dies 21 and 23 a further rotation of the crimping disks will separate the coöperative pairs of dies therein while the crimped strands, because of the presence of the curved guides 28 under each of the disks 13, will be directed around the lower arcs of the disks 13 and forwardly into the machine upon the curved tracks or ways 29 extending from the curved guides 28.

Movement is imparted to the crimping disks through the medium of a gear 30, carried on the stub shaft 31 and meshing with the pinion 8 (see Fig. 1) on shaft 6. The gear 30 meshes with a gear 32 on the shaft 14 carrying the crimping disks 13. The shaft 11 carrying the disks 10 is caused to rotate in unison with shaft 14 through the medium of the gear 33 carried on the shaft 11, which meshes with the gear 32, whereby the pair of crimping disks are caused to rotate in unison in opposite directions.

From the crimping disks the crimped strands move along the tracks 29 to the staple feeding mechanism shown more clearly in Fig. 30, and comprising an inclined track or guide 34 down which the staples 35 are fed, and which is provided with a curved portion 36 which embraces a portion of the periphery of a staple feeding cylinder 37, the shaft 38 of which is suitably journaled in the frame. Formed in the periphery of the staple feeding cylinder and extending longitudinally thereof is a recess or pocket 39 into which a plurality of staples drop as said cylinder in its rotation carries said pocket past the terminal points of the inclined guides 34. It will be understood that there is a staple guide for each of the strand wires 9 and that said guides are disposed in the plane of said strand wires so that as the feeding drum or cylinder 37 revolves the staples which enter the pocket 39 are discharged therefrom onto the strand wires with the legs of the staples hanging on each side thereof, as clearly shown in Fig. 30, said strand wires passing contiguous to the under side of said feeding drum or cylinder, and the track 29 which guides said strand wires having a depressed portion 40 to permit the legs of the staples to swing downwardly when deposited on the strand wires of the fabric, in which position said staples ride upon said strand wires and are carried thereon to the termination of the depression 40 in the track 29 where the depending legs on the staples encounter the shoulder 41 formed by the merging of the depressed portion of the track into the straight portion thereof, and are arrested thereby while the strand wires continue to run through the loops thereof. The staples remain lodged against the shoulder 41 until the succeeding transverse or stay wire 16, which is carried forward by the travel of the fabric, encounters the angle in the legs of the staple and carries the staple forward therewith. The operation of dragging the staples over the shoulders 41 in the tracks causes the terminal portions of the legs thereof to swing upwardly so as to stand above and on each side of the strand wires, a position in which the stay wires are embraced on one side by the strand wires and upon the other side by the angular legs of the staples, and in which position said staples are carried forward to the tying disks carrying coöperative tying dies between whose faces the operation of tying together the crossed strands of the fabric by means of said staples is completed, said operation being more clearly illustrated in Figs. 19, 20, 21, and 31, and which may be described as follows: After leaving the staple feeding cylinder the crossed strands, with the tying staples 35 embracing them as shown, are carried on the tracks 29 to and through the tying disks 42 and 43 respectively, between whose faces the terminals of the legs of the staples are bent across the strand wires from opposite directions in a manner to firmly fasten the tying staples in place. The operation of shaping the terminals of the staples across the strand wires to complete the joining of the crossed strands thereby is accomplished through the medium of the male dies which are set in the peripheries of the disks 42, and the coöperating female dies 45 which are set in the peripheries of the disks 43. The male dies are rigidly set in die blocks 46 and adjustably held in place by screws 47 seated in said blocks and passing into said dies in which they have a threaded engagement. The female dies 45 are movably mounted in die blocks 48 seated in the peripheries of the disks 43. Each of the dies 45 occupies a recess 49 in its die block 48 and is carried by a bolt 50 which is threaded in the die and passes through the recess in the die block into a socket 51 in the disk 43 in which the head of said bolt lies. Embracing each of said bolts between the base of the recess 49 and the die 45 is a coiled spring 52 which normally holds the die 45 projecting, as shown in Fig. 19, but which will yield to permit the die to recede into the recess 49, as shown in Fig. 20, for purposes hereinafter stated. As the rotation of the tying disks draws the crossed strands therethrough the tying dies are first caused to encounter the staples or ties, as illustrated in Fig. 31.

The operation of tying the staples about or upon the crossed strands to join them firmly together at their junctures will be described with reference to one pair of dies only, with the understanding that the same operation takes place between the working faces of the other sets of dies and that with respect to all of the corresponding sets of dies in the series of tying disks the operation is simultaneous. As the tying dies close together upon the crossed strands and the embracing staple, the loop of the staple enters the transverse concavity 53 in the male die 44 whereby the angular portions 54 of the legs of the staple which embrace the stay wire are crowded into the parallel longitudinal depressions 55 and 56 respectively, as more clearly shown in Figs. 24 and 25. At the same time the terminal of the longer leg 59 of the staple enters the transverse concavity 60 in the male die, and the terminal of the shorter leg 61 of the staple enters the transverse concavity 62 in said male die. The shape of the transverse concavity 60 and 62 is such that as the dies move together the terminals of the legs of the staple are bent across the strand wire from opposite sides in a curved plane, as clearly shown in Figs. 28 and 29. The crimp in the strand wire where it crosses the stay wire enters the depression 57 in the male die, and the straight portions of the stay wire enter the transverse channel 58 crossing said die as the working faces of the dies come more closely together. As pressure is brought to bear upon the female die it gradually recedes against the action of its spring 52, allowing said die to enter the recess 49 in the die block, said die ultimately seating on the bottom of said recess at the completion of the tying operation, as clearly shown in Fig. 20, in which position the tying of the knot is completed. The rotation of the tying disks repeats said operation as the pairs of tying dies are successively brought together at the meeting points between their peripheries, which operation it will be understood is concurrently common to each set of the tying disks acting upon one of the stay wires of the fabric. As the female dies recede into the recess 49 in their die blocks during the operation of tying, the longitudinal strands 9 enter and lie in the channels 63 in said blocks (see Fig. 24) and the cross strands or stay wires enter and lie in the transverse channels 64 in said die blocks, leaving the staple and crossed strands below the plane of the outer face of the blocks 48, as clearly shown in Fig. 21, in which position the tying staples remain fast in the dies whereby they are temporarily locked to the peripheries of the disks 43 so that through the rotation of said disks the strand wires are drawn upon to pull them through the machine and carry forward the completed fabric.

Rotation is imparted to the tying disks through the medium of the gear 7 on shaft 6, which meshes with a large gear wheel 65 on the shaft 66 carrying the series of lower tying disks 43. Also mounted on the shaft 66 is a large beveled gear wheel 67. On the shaft 68 of the upper series of tying disks is a large beveled gear 69, and fast to a vertical shaft supported at its ends in boxes 70, carried on the outer ends of the shafts 66 and 68, are the beveled pinions 71 and 72, the pinion 71 meshing with the gear wheel 67, and the pinion 72 meshing with the gear wheel 69. By this arrangement the shafts carrying the tying disks are caused to revolve in unison in opposite directions at the same rate of speed.

The fabric passes from the peripheries of the lower tying disks 43 between the crimping rolls 73 and 74, said rolls comprising hollow bars or tubes 75 extending between and secured in the ends thereof, and which are so positioned as to mesh together and crimp the fabric as said rolls roll together in a manner clearly illustrated in Fig. 5. This transverse crimping of the fabric is designed to give elasticity thereto so that when strained longitudinally when hung it will remain under such tension as to keep it taut. From the crimping rollers the crimped fabric passes on to a reel 76 which is rotated through the medium of a beveled gear 77 (see Fig. 1) mounted on the shaft 78 of said reel and meshing with a beveled pinion 79 on one end of a horizontal shaft 80. At the opposite end of said shaft there is a beveled pinion 81 which meshes with the large beveled gear 67, whereby, through the rotation of said last mentioned gear, said reel is caused to revolve.

The crimping rollers are driven through the medium of a spur gear 82 which meshes with the large gear wheel 65, and which is mounted upon the shaft 83 of the upper roller 73, the lower roller being driven by means of the gear wheel $82^a$ mounted on the opposite end of the shaft 83 which meshes with a gear $82^b$ on the end of shaft $82^c$ of the lower roller, as clearly shown in Fig. 2, whereby the crimping rollers are caused to turn in unison.

As already explained the main strand wires 9 enter the machine between the crimping disks 10 and 13. The selvage strands 84, however, which form the marginal longitudinal strands of the fabric enter the machine through the inclined hollow spindles 85 on each side thereof, and through which said strands are directed into horizontal alinement with the main strand wires 9 of the fabric at a point where said wires leave the under arcs of the crimping disks 13. To enable the terminals of the stay wires 16 to be wrapped around the marginal wires as shown in Fig. 11 the spindle 85, shown more clearly in Figs. 6, 7, and 8, is made to rotate with and slide longitudinally through a long bushing 86 (see Fig. 8) which is journaled within an embracing bearing 87, one end of said bushing carrying a threaded collar 89 (see Fig. 8) which screws against the end of the bearing 87 to retain said bushing therein, the other end of said bushing having a beveled pinion 90 secured rigidly thereto. Within the pinion 90 is a key 91 which enters a channel 92 in the spindle 85. By this arrangement the spindle may be moved longitudinally through the pinion 90 while being continuously rotated thereby. At the end of each of the spindles 85 is a twister head 93 which is secured to the enlarged end portion 94 of said spindle by means of a tongue 95 on said enlarged portion which enters a slot in the twister head, and by means of the screws 96 (see Figs. 8, 9, and 10) which pass through the twister head into said enlarged portion of the spindle. The tongue 95 takes the strain from the screws 96 while the arrangement enables the twister head to be readily removed by withdrawing said screws. Projecting from the end of each twister head is a curved overhanging lip 97 which extends from a point adjacent the central aperture 98 through said head to the periphery thereof. These lips on the twister heads, as they revolve, are adapted to engage the terminal portions 99 of the stay wires 16, as shown in Fig. 9, and wrap them around the selvage strands 85 which pass through the hollow spindles and the apertured heads 93 thereon to securely fasten said terminal portions to said selvage strands, as clearly shown in Fig. 11. Meshing with the beveled gear 90 upon the spindle of each of the twisters is a beveled gear 100 mounted upon a vertically disposed shaft 101 journaled in suitable bearings in the bracket 88. On the lower end of the shaft 101 is a beveled gear 102 which meshes with a like gear 103 on the end of a horizontal shaft 104 also carried in bearings on said bracket and having thereon a gear wheel 105, shown by dotted lines in Figs. 6 and 7, which meshes with a large gear wheel 106 on the main shaft 2 of the machine, whereby as said shaft revolves the desired rotary movement is imparted to the spindle 85. This method of rotating the spindle is employed at one side of the machine. To provide for rotating the spindle of the opposite side of the machine in the opposite direction, an idle gear 107 (see Fig. 5) is interposed between the gear 106 on the driving shaft and the gear 105 on the shaft 104, whereby the direction of rotation of the spindle 85 driven therefrom will be reversed.

As the travel of the longitudinal strands through the machine is continuous it is necessary to provide for actuating the twisters so as to enable them to follow the movement of the selvage strands during the operation of twisting the terminals of the stay wires thereto. To accomplish this result a reciprocal movement is imparted to each of the twister heads through the medium of a lever 108 fulcrumed at 109 to a portion of the bracket 88. The lower end of said lever is provided with an anti-friction roller 110 engaged by a cam 111 mounted on the main shaft 2 to rotate therewith, and through the medium of which said lever is oscillated upon its fulcrum. At the upper end of the lever is a slot 112 adapted to receive a pin 113 projecting from a collar 114, which loosely embraces the spindle 85 to permit said spindle to rotate therein. As the lever 8 reciprocates, the spindle 85 will be caused to slide longitudinally forth and back through the beveled pinion 90 and the embracing bushing 86. The cam 111 is so positioned upon the shaft 2 that when the parts in the operation of the machine reach the position shown in Fig. 6 the lever 108 will be actuated to slide the spindle longitudinally through its supporting bearing and carry the twister head into engagement with the end of the stay wire 16 which projects over the marginal strand 84. After encountering the projecting end of the stay wire the forward travel of the twister head by the graduation of the cam 111 is made to equal the speed at which the strand wires are moving through the machine so that during the operation of twisting the terminals of the stay wire around the marginal strand wires the twisters travel with the fabric, the position of the parts at the completion of the twisting operation being illustrated in Fig. 7, at which time the high point of the cam 111 passes from engagement with the roller 110 of the lever 108 when the retractor spring 115 will return said lever arm, the twister head, and the spindle to the initial position shown in Fig. 6 where they remain until the succeeding strand wire is brought into position to have the terminals thereof wrapped around the selvage wires, when the operation just described is repeated.

In order to adapt the machine for making fencing of different widths it is necessary to vary the distance between the selvage strand wires. To enable this to be accomplished it is necessary to so mount the twisting device at the sides of the machine as to render them adjustable toward and from each other. For this purpose therefore the brackets 88 carrying the twisting mechanism are each mounted to adjust transversely upon a fixed slideway 116 on the main frame, shown more clearly in Figs. 6, 7, and 32. Movement is imparted to said brackets to adjust them laterally by means of the upper and lower screw shafts 117 and 118 respectively, having threads on the opposite ends thereof. The upper shaft is threaded in a nut 119 carried in the left hand bracket (see Fig. 32), the smooth portion of said shaft serving as a slide for the right hand bracket, the terminals of said screw shaft being journaled in the sides of the frame. The lower screw shaft 118 is threaded in a nut 120 on the right hand bracket, the smooth portion of said shaft serving as a slide for the left hand bracket, the terminals of said shaft 118 being also journaled in the sides of the frame. The outer ends of said screw shafts are squared to receive the cranks 121 through the medium of which the screws may be turned to slide the brackets 88 with the twisting mechanism thereon transversely of the machine, so as to bring the selvage wires closer together or farther apart as may be desired. To enable the twisting mechanism to be driven at any point of adjustment the driving gear 106 is made to adjust along the shaft 2 through the medium of a key 122 carried thereby adapted to slide in a way in said shaft.

In order to adapt the machine for the manufacture of fencing wherein the strand wires may be placed any desired distance apart it is necessary that the crimping disks, the tracks over which the strands pass, and the tying disks be made adjustable transversely of the machine in opposite directions. The tying disks 42 and 43 are splined to their respective shafts by means of the longitudinally extending keys 123, which are common to all of the disks on each shaft whereby the disks are caused to turn with their shafts but may be moved longitudinally thereon. In order to hold the tying disks on each shaft in alined coöperation and at the same time permit of an adjustment of said disks longitudinally of their shafts concertedly or individually an adjusting screw 124 (see Fig. 36) is employed which passes through and is threaded in a nut 125 in each of said disks between those at the ends of the shaft. In the end disks 126 the screws 124 are journaled, as shown at 127, the projecting ends of which screws are squared as shown at 128 for the application of a wrench. The nuts 125 in which the adjusting shafts are threaded are normally loose within the disks and are held from rotation by the set screws 129 which pass through the peripheries of the disks into engagement with said nuts, the heads of said screws lying in sockets 130 in the peripheries of said disks, whereby the screws are rendered accessible for manipulation and yet are so disposed as not to interfere with the feeding of the strands onto and off of said disks as they revolve. When the nuts 125 in the disks are not locked by the set screws 129 the rotation of adjusting screw 124 will cause said nuts to rotate within the disks and will not adjust the disks along their supporting shaft. When it is desired to shift one or more of the disks the set screw 129 is turned so as to hold from rotation the nut of the disk which it is desired to adjust when by turning the adjusting screw the said nut will be caused to travel along the screw as it is rotated and shift the disk along its supporting shaft in either direction accordingly as the screw 124 is rotated. The end disks 126 are rigidly locked to the shaft at all times by means of set screws 131 so as to afford an anchorage for the screw 124. This arrangement alines all of the disks upon the shaft and causes them to turn in unison therewith. To enable the squared ends 128 of the adjusting screws to be reached from the outside of the machine for the purpose of adjusting the tying disks, the driving gears 67 and 69 (see Fig. 1) are provided with apertures 132 through which a wrench may be passed for the purpose of manipulating the adjusting screws 124.

The adjustment of the tying disks along their shafts makes necessary a corresponding adjustment of the tracks 29, which direct the crossed strands and tying staples thereto. This adjustment of said shafts is effected by providing each track with a depending bracket 133 (see Fig. 34) in each of which is rotatably seated a nut 134. Threaded in said nuts and common to each of said brackets is an adjusting screw 135, which, at its opposite ends is journaled in the frame, as shown at 136. Upon one end of the adjusting screw 135 is a beveled gear 137 which meshes with a like gear 138 (see Fig. 1) on one end of the horizontal shaft 139, the opposite end of said shaft being squared for the application of a wrench, as shown at 140. By turning the shaft 139 the adjusting screw 135 will be rotated, as will be well understood. Each of the nuts 134 is provided with a set screw 141 (see Fig. 35) which passes through the bracket 133, and which is employed to lock said nut from rotation within the bracket when it is desired to shift the bracket and track by rotation of said adjusting screw. The brackets are mounted to slide upon transverse guide rods 142 which pass therethrough and are supported at their ends in the frame of the machine.

The crimping disks 10 and 13 are adjusted along their respective shafts to correspond with the adjustment of the tracks and the tying disks in exactly the same manner as the tying disks are adjusted, being provided like the tying disks with nuts 143 loosely mounted therein through which are threaded adjusting screws 144 (see Fig. 12). When it is desired to adjust the crimping disks along their shafts 11 and 14 respectively the nuts 143 therein are held from rotation by means of the set screws 145 to enable said disks to be moved along their shafts as their adjusting screws are rotated. The adjusting screws of the crimping disks are provided with squared ends 146 (see Fig. 5) which are made accessible to a manipulating wrench by reason of the apertures 147 (see Fig. 1) formed through the driving gears 32 and 33 upon the shafts of said crimping disks. By this arrangement the crimping disks, the guiding tracks, and the tying disks may be correspondingly adjusted transversely of the machine so as to vary the space between the strand wires of the fabric as may be desired. The before-described adjustment of the twisting devices enables said parts to be moved to correspond with any adjustment of other parts of the machine.

It has before been explained that pickers, consisting of curved fingers 22 mounted upon plates 19 carried by the crimping disks, are employed to successively pick from the inclined table 17 stay wires and present them under the strand wires 9 as the crimping disks revolve. To increase the distance between the stay wires, the screws 20 which hold the plates 19 in place are loosened in each successive plate, and said loosened plates swing so the projecting fingers 22 thereon will not extend beyond the periphery of the crimping disk 10, so that a stay will be picked from said table by each alternate set of pickers, thereby feeding but one-half the number of stays into the fabric and correspondingly increasing the distance between them. By this arrangement the stay wires may be placed any desired distance apart.

The staple feeding drum or cylinder 37, through the rotation of which a plurality of staples is presented to the strand and stay wires, is rotated through the medium of a gear 148 on shaft 14 which meshes with an idle gear 149 journaled on a shaft 150, mounted in a slot 151 (see Fig. 2) of a swinging arm 152 hung from the shaft 38 of the staple feeding cylinder 37, said gear 149 meshing with a gear 153 on said shaft 38, an arrangement which will drive the staple feeding cylinder at a certain speed. To enable said feeding cylinder to be driven at a different speed the gear 149 is moved inwardly on its shaft 150 by removing the collar 154 thereon, and is swung into engagement with the gear 155 on the shaft of the feeding cylinder by adjusting shaft 150 of said gear 149 upwardly in the curved slot 151 of the swinging arm 152. The lower end of said swinging arm is anchored when adjusted by means of a bolt 156 (see Fig. 2) which passes through a projecting part on said arm into the frame of the machine. To effect a still further variation in the speed of the staple feeding cylinder the large gear 157 mounted on the shaft 14 is employed, with which the gear 149 is brought into engagement by swinging downwardly the arm 152 carrying said gear 149, and by adjusting the shaft 150 in the slot 151 in said arm to bring said gear 149 into engagement with the gear 155 on the shaft of the staple feeding cylinder.

To provide for applying the proper pressure to the tying disks to hold their peripheries in proper working relation, adjusting screws 158 are employed which pass through suitable nuts 159 in the cross heads 160 on the frame, the lower ends of said screws being swiveled in the adjustable bearing boxes 161 (see Fig. 2) which carry the ends of the shaft 68 of the upper disks 42. By a manipulation of said screws the tying disks may be held together under proper pressure. For the purpose of holding the crimping disks together under proper pressure the ends of the shaft 11 are held in sliding boxes 162 (see Fig. 2) engaged by actuating screws 163 suitably mounted in the frame. By manipulating said screws the shaft carrying the crimping disks 10 may be adjusted for the purpose stated.

Having thus fully set forth my invention, what I claim as new and desire to secure by Letters Patent, is:—

1. In a wire fabric machine, the combination with means for moving the strand wires through the machine, of means for introducing the stay wires across the strand wires, means for introducing marginal strand wires and directing them to a point where the terminals of the stay wires will project thereover, means for crimping the crossed wires together, means for wrapping the terminals of the stay wires around the marginal strand wires, means for subsequently introducing tying staples to embrace the crimped strands at their points of crossing, and rotatable tying disks having coöperating dies therein which embrace the crossed strands and staples, said dies forming the legs of the staples across the strand wires from opposite sides as their working faces are brought together by the rotation of the tying disks.

2. In a wire fabric machine, the combination with means for moving the strand wires continuously through the machine, of means for intermittingly introducing stay wires transversely of the strand wires, means for crimping and carrying the crossed strands forward, means for introducing tying staples to the crossed strands at their points of crossing, and dies one rigid and the other yieldably mounted moving with the fabric for pressing the legs of the staples across the strand wires at one side of the stay wire during the continuous travel of the fabric through the machine.

3. In a wire fabric machine, the combination with means for moving the strand wires through the machine, of means for introducing the stay wires transversely of the strand wires, means for introducing tying staples astride of the strand wires with their legs depending, means for swinging the legs of the staples across the stay wires, and tying dies moving with the fabric and adapted to close upon the crossed strands and staples, said dies in closing directing the terminals of the legs of the staples across the strand wires at one side of the stay wire to effect a tying of the crossed strands together.

4. In a wire fabric machine, the combination with means for moving the strand wires through the machine, of means for introducing stay wires across the strand wires, a series of rotatable crimping disks between whose faces the crossed strands are crimped together, means for feeding tying staples to said crossed strands to engage them at their points of crossing, a series of rotatable tying disks between whose faces the terminals of the legs of the staples are directed across the strand wires to complete the operation of tying the crossed wires together as said disks revolve, means for adjusting the tying disks longitudinally of their shafts, and means for correspondingly adjusting said crimping disks.

5. In a wire fabric machine, the combination with means for moving the strand wires through the machine, of means for introducing stay wires across the strand wires, a series of rotatable crimping disks between whose faces the crossed strands are crimped together, adjustable tracks on which the crossed strands and staples are directed through the machine, a series of rotatable tying disks between whose faces the terminals of the legs of the staples are directed across the strand wires to complete the operation of tying the crossed wires together as said disks revolve, means for adjusting the tying disks longitudinally of their shafts, means for correspondingly adjusting said crimping disks, and means for adjusting said tracks to correspond with the adjustment of the crimping and tying disks.

6. A wire fabric machine comprising means for introducing strand wires and stay wires transversely of the strand wires, means for introducing marginal strand wires and directing them to a point where the terminals of the stay wires will project thereover, means for engaging the projecting terminals of the stay wires and wrapping them around the marginal strand wires, and means for subsequently joining the intermediate strand wires to the stay wires at their points of crossing.

7. A wire fabric machine comprising means for introducing the main portion of the strand wires and for introducing stay wires across said strand wires, means for crimping the main strand wires and stay wires together, means for introducing marginal strand wires and directing them to a point where the terminals of the stay wires will extend thereover, rotatable twisters movable with and independently of the marginal strand wires adapted to engage and twist the terminals of the stay wires around said marginal wires, means for subsequently introducing staples to the intermediate strand wires at the points where said wires are crimped to the stay wires, and means for subsequently tying said staples to said strand and stay wires to unite them at their points of crossing.

8. In a wire fabric machine, the combination with means for introducing the main strand wires and for introducing the stay wires across the strand wires and joining said crossed wires at their junctures, of means for introducing marginal wires, twisting apparatus for wrapping the terminals of the stay wires around said marginal wires, and means for adjusting the twisting apparatus transversely of the machine.

9. A wire fabric machine comprising means for feeding the strand and stay wires into the machine, means for introducing staples to said wires at their points of crossing, rotatable tying disks between whose faces the staples are tied to the crossed strands, said disks being slidably mounted upon an adjusting screw carried by and passing through said disks and rotatable therewith, and means for locking each of said disks to said screw to effect an adjustment thereof as the screw is rotated.

10. A wire fabric machine, comprising means for carrying through the machine the strands from which the fabric is formed, tracks for supporting said strands, each track having a depending bracket, an adjusting screw passing through the bracket of each track, means for rotating said screw, and means for locking each bracket to the screw to effect an adjustment of the track carried thereby as the screw is rotated.

11. A wire fabric machine, comprising means for introducing and carrying through the machine the strand and stay wires, means for crimping said wires together at their points of crossing, means for intermittingly introducing a plurality of staples to the strand wires to lie thereon in the path of the stay wires, means for moving the strand and stay wires to carry the stay wires against said staples and move the staples along with the travel of the fabric, and means for tying said staples about the intersections of the strand and stay wires as the fabric is moved through the machine.

12. In a wire fabric machine, the combination of instrumentalities for directing the strand and stay wires into the machine, crimping said wires at their points of crossing, depositing staples on the strand wires at the junctures of the stay wires therewith, of rotatable coöperating tying disks having dies seated in the peripheries thereof, said dies being adapted to close upon said staples and tie them about the crossed strands as the disks roll together, the under dies being yieldingly supported in working relation with the upper dies.

13. In a wire fabric machine, the combination with means for introducing the main strand wires, of means for introducing the strand wires and stay wires across the strand wires and joining said crossed wires at their junctures, means for introducing the marginal wires and for moving them regularly forward, twisting apparatus for wrapping the terminals of the stay wires around said marginal wires, and means for moving said apparatus along with the marginal wires during the twisting operation.

14. In a wire fabric machine, the combination with means for introducing the main strand wires at constant speed, means for introducing the stay wires across the strand wires, means for joining the strand and stay wires, means for introducing marginal wires at constant speed at an angle to the plane of introduction of the main strand wires, and twisting apparatus for wrapping the ends of the stay wires around the marginal wires while the marginal wires are moving regularly forward.

15. In a wire fabric machine, the combination with means for introducing the main strand wires at constant speed, means for introducing the stay wires across the strand wires, means for bending said stay and strand wires to join them, means for introducing marginal wires at constant speed, constantly revolving twisting devices through which the marginal wires pass, and means for moving the twisting devices with the stay wires so they may be wrapped around the marginal wires while the fabric is moving forward.

16. In a wire fabric machine, the combination with means for introducing the main strand wires at constant speed, means for introducing the stay wires across the strand wires, means for bending said stay and strand wires to join them, means for introducing marginal wires at constant speed, constantly revolving twisting devices through which the marginal wires pass, means for moving the twisting devices with the stay wires so they may be wrapped around the marginal wires while the fabric is moving forward, and means for securing fastening devices around the stay and strand wires after the ends of the stay wires have been wrapped around the marginal wires.

17. In a wire fabric machine, the combination with means for introducing the main strand wires at constant speed, means for introducing the stay wires across the strand wires, means for introducing a marginal wire at constant speed, and a constantly revolving twisting device through which the marginal wire passes and by which the ends of the stay wires are wrapped around the marginal wire while the fabric is moving forward.

18. In a wire fabric machine, the combination with means for introducing the main strand wires at constant speed, means for introducing the stay wires across the strand wires, means for introducing a marginal wire at constant speed, and a constantly revolving twisting device through which the marginal wire passes and by which the ends of the stay wires are wrapped around the marginal wire while the fabric is moving forward, said twisting device comprising a hollow revolving shaft, a sleeve revolving therewith and slidable thereon, and means on said sleeve for engaging the stay wires.

19. In a wire fabric machine, the combination with means for introducing the main strand wires at constant speed, means for introducing the stay wires across the strand wires, means for introducing a marginal wire at constant speed, and a constantly revolving twisting device through which the marginal wire passes and by which the ends of the stay wires are wrapped around the marginal wire while the fabric is moving forward, said twisting device comprising a hollow revolving shaft, a sleeve slidable thereon and revolving therewith, and a curved finger on said sleeve for engaging the ends of the stay wires and carrying them around the marginal wire.

20. In a wire fabric machine, the combination of means for introducing the main strand wires at uninterrupted speed, a constantly revolving device for carrying the cross wires to the line wires, means for twisting the ends of the cross wires around the two outer strand wires, and means to cause said twisting device to move with the strand wires during such twisting operation.

21. In a wire fabric machine, the combination of means for continually feeding the main strand wires longitudinally, means for feeding the transverse wires into the machine, means for moving these transverse wires into contact with the strand wires and then moving them along with the strand wires, means for twisting the adjacent ends of transverse wires around the outer strand wires, and means to cause said twisting devices to move with the strand wires during such twisting operation.

In testimony whereof, I sign this specification in the presence of two witnesses.

CLARENCE E. SAFFORD.

Witnesses:
J. OTTO BAENZIGER,
M. E. BROESAMLE.